July 3, 1956 — L. SCHMID — 2,753,074
CONTAINER SEALS OR CLOSURES
Filed March 6, 1950
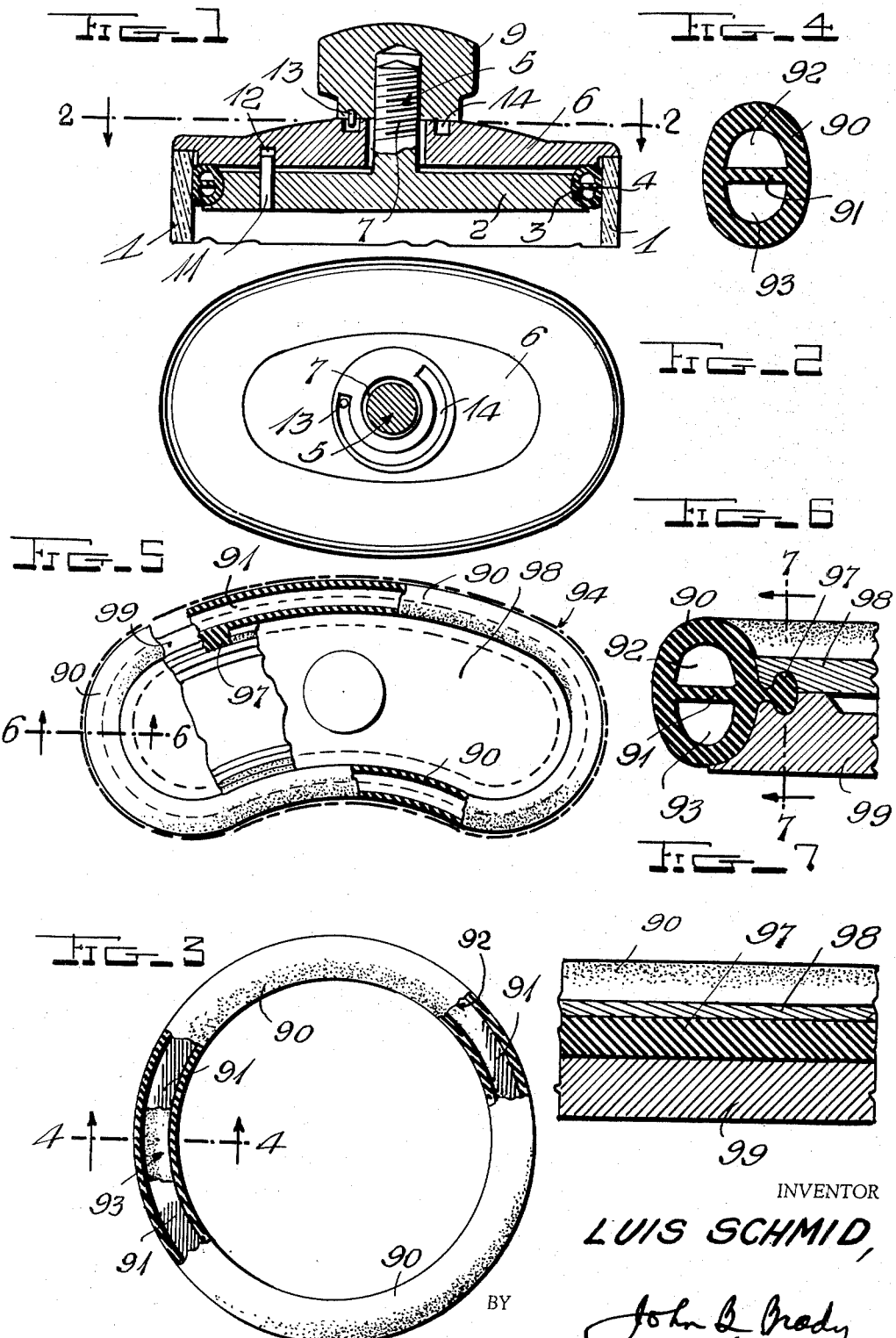
INVENTOR
LUIS SCHMID,
BY John B. Brady
ATTORNEY

United States Patent Office 2,753,074
Patented July 3, 1956

2,753,074

CONTAINER SEALS OR CLOSURES

Luis Schmid, Tussenhausen, Bavaria, Germany, assignor to Interpa-Corporation Registered Trust, Vaduz, Liechtenstein Application March 6, 1950, Serial No. 147,956

9 Claims. (Cl. 220—24.5)

This invention provides firstly an improved hollow tube for use as a container seal and secondly improved arrangements of container closures incorporating such seals. More particularly the invention provides detachable closing and sealing devices, for tins, containers, silos and similar receptacles.

The use of a flexible, hollow or tubular sealing ring contained between two relatively adjustable compression or closure elements is essentially known, but in accordance with the present invention an elastically moldable tube is supplemented by a transverse web integral with the tube wall and arranged to be stressed in tension by deformation of the tube cross-section.

Another feature of the invention is that the sealing ring is supported over part of its cross-section in the direction of expansion, and has an elliptical or a circular plan form adapted to the mouth of the container.

The container closure may be an internal or plug closure, or a cap closure. Several such closures may be provided in series or in steps, adapted for one and the same container or for a number of nested containers. Moreover the closure may be buoyant on the liquid contents of the container.

The seal may be pneumatically or hydraulically inflatable, the latter in particular for closing large containers.

By virtue of the expandable seal the invention provides a hermetical, air and water-tight means of sealing which can be manually operated by a single motion for making or breaking the seal. The invention is universally applicable irrespective of dimensions, for closing bottles or small ointment pots, vats, tanks, doors or partitions, and so forth, and the term container as herein used is to be understood in this sense.

The foregoing and other features of the invention will be clear from the following description in connection with the accompanying drawings which represent the principle of the invention in different forms of execution.

Referring to the drawings:

Fig. 1 shows in sectional elevation one form of container closure;

Fig. 2 is a section on line 2—2 of Fig. 1;

Fig. 3 is a plan view partly in cross-section of the sealing ring;

Fig. 4 is a vertical sectional view on line 4—4 of Fig. 3;

Fig. 5 shows a similar sealing ring but with an external stiffening rib, the view showing the ring applied to the top of a container;

Fig. 6 is an enlarged transverse sectional view on line 6—6 of Fig. 5; and

Fig. 7 is a vertical sectional view of a fragmentary part of the sealing ring, the view being taken substantially on line 7—7 of Fig. 6.

In Fig. 1 the container to be closed is indicated by 1. The container closure comprises two reciprocally-movable compression elements 2 and 6 forming gripping jaws for the hollow sealing ring 4 of rubber (natural or artificial), plastic, cork, leather or equivalent material. The cross-section of the sealing ring is D-shaped to afford a flat bearing surface of the ring against the inner surface of the container; but the ring may be of circular elliptical or of oval cross-section. The tubular sealing ring or gasket is reinforced in the direction of its expansion against the closure element 2, by a rounded recess 3 which extends over more than one quarter of the circumference of the ring over its entire length; it may be attached by cementing to the element 2 to form an integral connection between the sealing ring or gasket and this element.

The sealing ring or gasket may be of circular plan form or, as shown in Fig. 2, it may have a non-circular plan form such as an ellipse or a polygon with rounded angles; this having the advantage that the sealing ring or gasket cannot slip while being tightened.

A pin 11 projecting from the closure element 2 into a socket 12 in the closure element 6 enables these two elements to be reciprocally adjusted. A screw 5 projecting from the element 2 passes through the element 6 and is engaged by a nut 9 bearing against the element 6. By suitably selecting the pitch of the thread 7 of the screw 5, any desired length of stroke of the elements 2 and 6 can be obtained. A pin 13 fixed in the head of the nut 9 and projecting into a groove 14 of the element 6, limits the motion of the nut 9 to less than one complete revolution and simultaneously holds the nut 9 in position with respect to the elements 2 and 6. In order to detach these parts from each other, it is only necessary to press the elements 2 and 6 together when the pin 13 will become disengaged from the groove 14 and the nut 9 can be removed by rotating it off the screw 5. When the nut 9 is rotated clockwise, it draws the elements 2 and 6 together as a consequence of which the sealing ring or gasket is compressed and expands in the only direction available, namely towards the wall of the container, thus producing an intimate seal between it and the wall of the container and hence a tight closing of the container. The release of the closure is effected in the reverse manner, the parts 6 and 2 being caused to move apart by which the elastic sealing ring or gasket is enabled to return into its original position.

The sealing ring or gasket may be filled or inflated with a suitable medium, e. g. a liquid or air.

The drawings show the sealing ring consisting of an elastically-deformable tube 90, suitably made of rubber (natural or artificial) having a web 91, crossing its internal bore and thus forming two chambers 92 and 93, the web extending in a medial plane coincident with the plane of the diameter or radii on which the sealing ring are formed. The web 91 is appreciably thinner than the wall of the tube 90 with which it is integral and extends across the minor axis of the tube 90 providing symmetrically disposed chambers 92 and 93 through which the major axis of the tube 90 extends. The web 91, by virtue of the fact that the web 91 is appreciably thinner than the wall of the tube 90, has greater elasticity than the elasticity of the wall of the tube. Apart from the fact that the partitioned tube may be used to contain different media, gaseous or liquid, this form of tube is particularly suitable for use as a sealing ring. When a tube, in particular a circularly-bent hollow ring, is compressed small tensile elongations take place on the circumference of the ring. Rubber shows a tendency to fatigue at such low elongation values. This is prevented by the introduction of the web or partition 91, which under compression, experiences a tensile elongation of 20–30% for 2–4% peripheral tensile elongation of the tube wall. The web thus continually tends to bring the tube back into the original form since it, being stressed with higher elongation forces, does not fatigue so rapidly and recovers its original form more readily. Each semicircular half of the tube wall acts as a bow, with the web as the bowstring.

Fig. 5 shows a kidney-shaped outline of a container cross-section, in a broken line 94. The tubular sealing ring or gasket is indicated by 90, and its internal web by 91. Figs. 6 and 7 show more clearly the reinforcing ridge or web 97 running on the outside of the tube, which may if preferred, be T-shaped as shown. This external web is held between cover elements 98 and 99. This external web 97 is used to retain the flexible, tubular sealing ring or gasket 90 in straight or concave shape, since with a freely-movable gasket its annular form would not adapt itself to the concavity of the container cross-section (outline 94).

While I have described my invention in certain preferred embodiments, I realize that modifications may be made and I desire that it be understood that no limitations upon my invention are intended other than may be imposed by the scope of the appended claims.

I claim:

1. A gasket for a container seal comprising an elastically-deformable endless continuous tube having a transverse web integral with the wall of the tube and extending in a medial plane coincident with the radii defining the peripheral contour of the tube and forming symmetrical curved internal fluid enclosing chambers on opposite sides of the web and arranged to be stressed in tension intermediate said chambers by distortion of the tube cross-section, said web having greater elasticity than the elasticity of the wall of said tube.

2. A gasket for a container seal comprising an elastically-deformable tube having a transverse elastic partition extending radially across the tube, said partition being appreciably thinner than the wall of the tube and dividing the tube into a pair of symmetrically disposed internal fluid enclosing endless continuous passages each having curved walls integrally connected with said elastic partition and wherein the external surfaces of said walls constitute sealing zones adjacent the opposite transverse ends of said partition.

3. A gasket as set forth in claim 1 in which an inwardly extending rib is integrally connected to the radially inner side of the wall of the tube at its external surface and aligned with said transverse web, thus forming a central support for said tube.

4. A gasket as set forth in claim 2 in which said tube is substantially elliptical in transverse section and wherein sealing zones are also established by the external surfaces of the walls thereof on an axis substantially normal to the plane of said elastic partition.

5. A gasket as set forth in claim 1 including an inwardly extending ridge secured to the radially inner side of the tube wall at its external surface for restraining the expansion or deformation of said container do diametrical and radial directions through the wall of the tube.

6. A gasket comprising an elastically-deformable tube formed on radii having centers disposed within the curved peripheral contour of the tube and having a transverse section that is substantially elliptical, a transverse web integrally connecting the interior surfaces of the wall of said tube along the minor axis of said section and extending in a plane substantially coincident with the plane passing through the centers on which said tube is peripherally curved, said transverse web having a compression and elongation characteristic that appreciably differs from the compression and elongation characteristic of the wall of said tube, and a substantially T-shaped inwardly extending rib connected with the radially inner side of the wall of the tube at its external surface and aligned with said transverse web for forming a central support for said tube.

7. A gasket comprising an elastically-deformable tube formed on radii having centers disposed within the curved peripheral contour of the tube and having a transverse section that is substantially elliptical, a transverse web integrally connecting the interior surfaces of the wall of said tube along the minor axis of said section and extending in a plane substantially coincident with the plane passing through the centers on which said tube is peripherally curved, said web having a tensile elongation characteristic of 20-30% for 2-4% peripheral tensile elongation characteristic of the wall of the tube.

8. A gasket comprising an endless, continuous, tubular member formed from elastic material, a diametrical web integrally connected with the inner surfaces of the wall of said tubular member and dividing said member into two adjacent compartments, said diametrical web having a thickness less than the thickness of the wall of said tubular member, a fluid filling for each of said compartments for resisting deformation of said tubular member and oppositely disposed sealing zones on the external surfaces of the wall of said tubular member for receiving compression sealing forces in alignment with the diametrical direction of said diametrical web, and an inwardly extending rib integrally connected with the radially inner side of the wall of the tubular member at its external surface and aligned with said diametrical web for forming a central support for said tubular member.

9. In combination, a sealing gasket comprising a tubular member of elastic material in endless form reinforced with a transverse diametrical integral web and filled with fluid and forming a flexible sealing ring, a pair of relatively movable compression elements forming a cover for a container having a wall forming the container enclosure and terminating in a top peripheral edge portion, said flexible sealing ring being disposed between said compression elements and means for forcing the sealing ring into sealing relation with the inner surface of the container wall, said means comprising an operating screw for effecting reciprocal motion of the compression elements and wherein one of said compression elements is provided with a groove and a rotative nut coacting with said screw, and a stop pin extending from said rotative nut and engaging in said groove for guiding said rotative nut as said nut operates over said screw.

References Cited in the file of this patent

UNITED STATES PATENTS

| 303,558 | Campbell | Aug. 12, 1884 |
| 658,588 | Reynolds et al. | Sept. 25, 1900 |
| 668,501 | Davis | Feb. 19, 1901 |
| 1,683,336 | Cummings | Sept. 4, 1928 |
| 1,854,855 | Nakashima | Apr. 19, 1932 |
| 1,966,202 | Pfefferle | July 10, 1934 |
| 2,096,358 | Gautier | Oct. 19, 1937 |
| 2,147,771 | Hathaway | Feb. 21, 1939 |
| 2,201,322 | Schwartz | May 21, 1940 |
| 2,217,875 | Nauert | Oct. 15, 1940 |
| 2,259,940 | Nathan | Oct. 21, 1941 |
| 2,306,990 | Essl | Dec. 29, 1942 |
| 2,309,974 | Miller | Feb. 2, 1943 |
| 2,438,153 | Dick | Mar. 23, 1948 |
| 2,457,908 | Meyerhoefer | Jan. 4, 1949 |
| 2,559,564 | Sperling | July 3, 1951 |

FOREIGN PATENTS

| 475,755 | Great Britain | Nov. 25, 1937 |